(12) United States Patent
Neto et al.

(10) Patent No.: US 8,462,578 B2
(45) Date of Patent: Jun. 11, 2013

(54) CHARGE PUMP CIRCUIT WITH FAST START-UP

(75) Inventors: Fernando Zampronho Neto, Campinas (BR); Walter Luis Tercariol, Campinas (BR)

(73) Assignee: Freescale Semiconductor, Inc., Austin, TX (US)

( * ) Notice: Subject to any disclaimer, the term of this patent is extended or adjusted under 35 U.S.C. 154(b) by 168 days.

(21) Appl. No.: 13/113,212

(22) Filed: May 23, 2011

(65) Prior Publication Data

US 2012/0300552 A1 Nov. 29, 2012

(51) Int. Cl.
*G11C 8/00* (2006.01)
(52) U.S. Cl.
USPC ...................................... 365/233.1
(58) Field of Classification Search
USPC ...................................... 365/233.1
See application file for complete search history.

(56) References Cited

U.S. PATENT DOCUMENTS

| | | | |
|---|---|---|---|
| 4,962,512 A | 10/1990 | Kiuchi | |
| 5,798,915 A | 8/1998 | Thomsen | |
| 7,173,477 B1 | 2/2007 | Raghavan | |
| 7,176,748 B2 * | 2/2007 | Khouri et al. | 327/536 |
| 7,362,084 B2 | 4/2008 | Tran et al. | |
| 7,592,856 B2 | 9/2009 | Ito et al. | |
| 7,663,428 B2 * | 2/2010 | Matano | 327/536 |

* cited by examiner

*Primary Examiner* — Anthan Tran

(57) ABSTRACT

A charge pump circuit (300) includes a charge pump (330), and clocking circuitry that includes a clock generator (310) and a bypass circuit (320). The clocking circuitry generates clock signals and higher frequency alternative clock signals, for driving the charge pump. Upon start-up of the charge pump circuit and depending on a present value of an output voltage of the charge pump, the clocking circuitry couples to the charge pump either the alternative clock signals and not the clock signals, or the clock signals and not the alternative clock signals. Prior to completion of start-up of the charge pump circuit, at least two rows of pump unit cells are driven by a same alternative clock signal, thereby causing a pump unit cell in a row to charge/discharge at a same time as another pump unit cell in another row, thereby decreasing a start-up time of the charge pump circuit.

19 Claims, 6 Drawing Sheets

700

CHARGE PUMP CIRCUIT WITH FAST START-UP

BACKGROUND

1. Field

This invention relates generally to charge pump circuits, and more specifically to a charge pump circuit that has more than one type of operation.

2. Related Art

A charge pump circuit is used for supplying other circuits with a voltage at a value other than a value of a supply voltage. A charge pump circuit includes a charge pump, which is a circuit that produces a voltage that is higher or lower than its input voltage, and a regulation stage that regulates the voltage produced by the charge pump.

FIG. 1 is a block diagram of a simplified charge pump circuit 100, which includes an input terminal for receiving an input voltage $V_{IN}$, an input terminal for receiving an ENABLE signal, an input terminal for receiving clock signals, an output terminal for outputting a PUMP_OK signal, and an output terminal for outputting an output voltage $V_{OUT}$. An output capacitor $C_{out}$ is coupled between the $V_{OUT}$ output terminal and a ground terminal. The charge pump circuit 100 includes a plurality of pump unit cells, or configurable pullup units (CPUC), one of which is illustrated in an idealized way in FIG. 1. Each pump unit cell includes a diode and a pump capacitor $C_i$.

FIG. 2 is a chart 200 showing signals in the charge pump circuit 100. The ENABLE signal activates the charge pump circuit 100. A charge pump circuit has basically three modes of operation: skip mode, linear mode and linskip mode, which is a combination of the other two modes. Regardless of the mode of operation of a charge pump circuit, $V_{OUT}$ of a charge pump circuit has a value of $V_{IN}$ when the charge pump circuit is first activated and $V_{OUT}$ increases in relatively small steps $V_{step}$, each step occurring at intervals dependent upon a frequency of the clock signal. Therefore, $V_{OUT}$ needs a certain amount of time Δt to reach a target value $V_{TARG}$. Circuits supplied with power from a charge pump circuit may need to wait such certain amount of time for $V_{OUT}$ to reach $V_{TARG}$ before being able to utilize the power from the charge pump circuit. In a charge pump circuit, Δt is basically dependent on capacity of the charge pump. The state of the PUMP_OK signal indicates that $V_{OUT}$ is stabilized at $V_{TARG}$.

One known method of reducing Δt is to increase the clock frequency, but increasing the clock frequency can cause detrimental electromagnetic compatibility (EMC) and electromagnetic interference (EMI) effects. Another known method of reducing Δt is to increase the capacitance of each $C_i$, but increasing the capacitance of each $C_i$ has a disadvantage of increasing the area of the charge pump. For example, doubling the capacitance of each $C_i$ would almost double the area of the charge pump.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
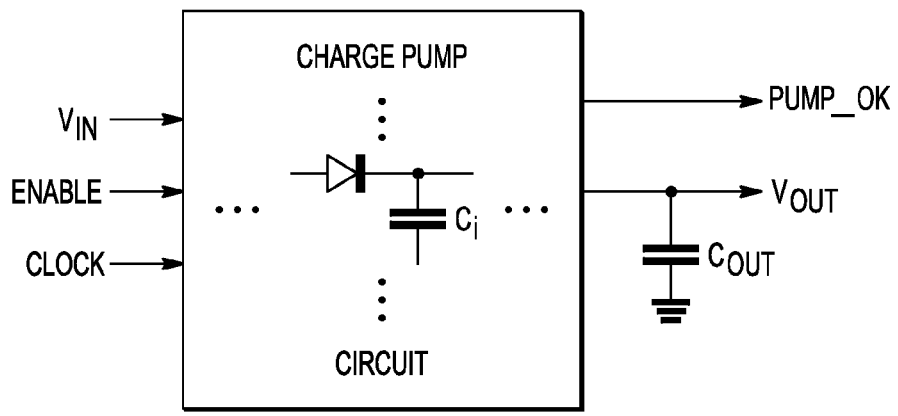
FIG. 1 is a block diagram of a simplified charge pump circuit.
Figure 2:
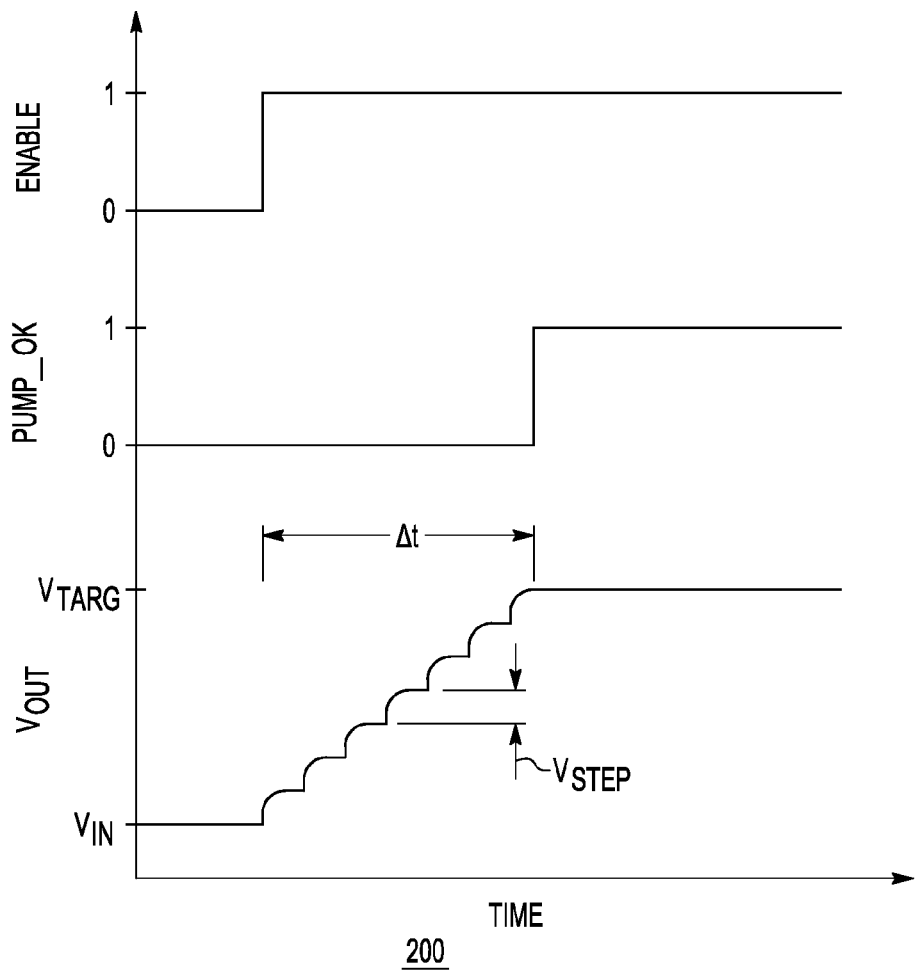
FIG. 2 is a chart showing signals in the simplified charge pump circuit of FIG. 1.
Figure 3:
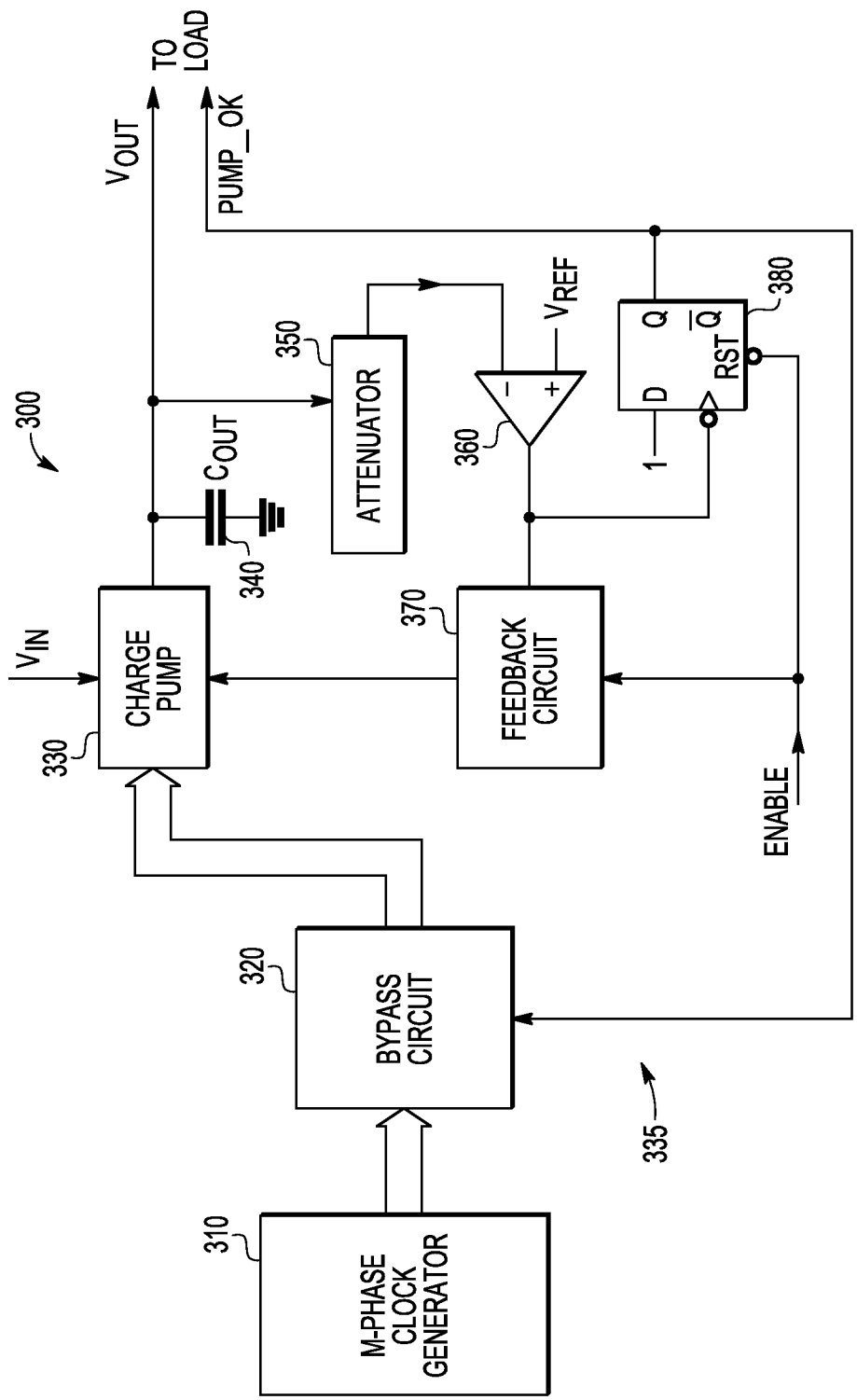
FIG. 3 is a functional block diagram of a charge pump circuit that includes a charge pump and a bypass circuit in accordance with the invention, and an m-phase clock generator.

FIG. 3 illustrates a simplified functional block diagram of a charge pump circuit 300 in accordance with the invention. The charge pump circuit 300 includes a charge pump 330 and a regulation stage 335 that regulates an output voltage $V_{OUT}$ produced by the charge pump. The regulation stage 335 includes a bypass circuit 320 in accordance with the invention. Known charge pump circuits lack a bypass circuit. In one embodiment, the bypass circuit 320 is coupled, via a bus, to an m-phase clock generator 310. The bypass circuit 320 is coupled, via a bus, to the charge pump 330. The m-phase clock generator 310 outputs, to the bypass circuit 320, a plurality of clock signals. The number of clock signals and the width of the bus depend upon a size of the charge pump 330. The plurality of clock signals outputted by the m-phase clock generator 310 can be expressed as CLK0°, CLK360°/m, CLK2×360°/m, CLK3×360°/m, . . . , CLK(m−1)×360°/m. The charge pump 330 includes an input terminal for receiving an input voltage $V_{IN}$, and an output terminal for outputting an output voltage $V_{OUT}$. An output capacitor $C_{out}$ 340 is coupled between the output terminal and a ground terminal. The regulation stage 335 includes an attenuator 350 having an input coupled to the output of the charge pump 330 and having an output coupled to a comparator 360. The comparator 360 compares a voltage of a signal outputted by the attenuator 350 with a reference voltage $V_{REF}$, and outputs a signal to a feedback circuit 370 and to a flip-flop 380. The flip-flop 380 outputs a PUMP_OK signal to a load, such as a flash memory circuit, and to the bypass circuit 320. The state of the PUMP_OK signal indicates that $V_{OUT}$ is stabilized at $V_{TARG}$. An ENABLE signal is fed into the feedback circuit 370 and into a reset terminal (RST) of the flip-flop 380. In one embodiment, the ENABLE signal comes from an internal logic control of the flash memory circuit. The feedback circuit 370 outputs a signal that turns on the charge pump 330, based on a state of the ENABLE signal and a present value of $V_{OUT}$. In one embodiment, a high, or logical "1", ENABLE signal in conjunction with a present value of $V_{OUT}$ below $V_{TARG}$ turns on the charge pump circuit 300.

Figure 4:
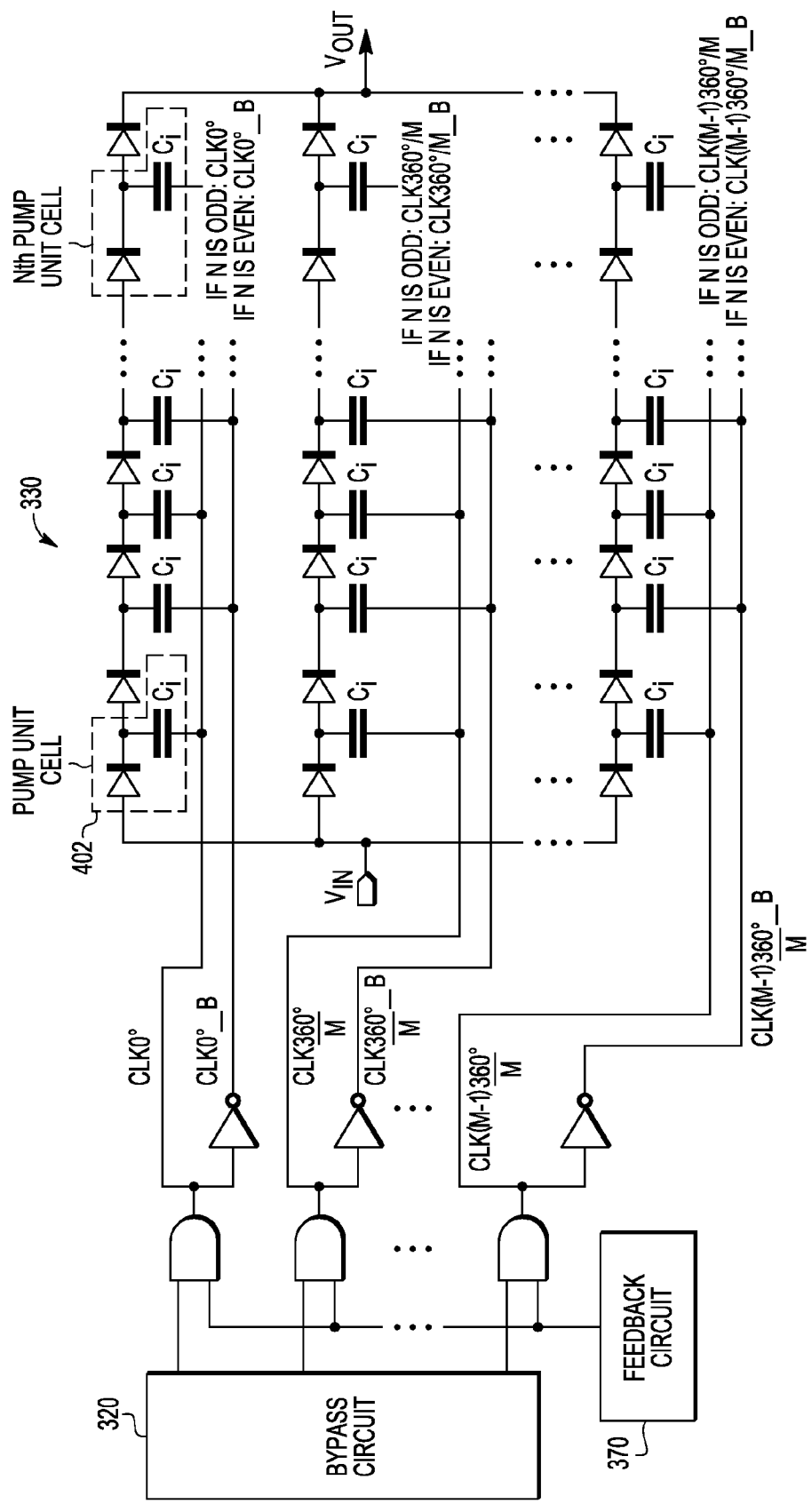
FIG. 4 is simplified schematic of the charge pump of FIG. 3.

FIG. 4 is simplified schematic of the charge pump 330. In one embodiment, the charge pump 330 is a Dickson charge pump. The charge pump 330 includes a plurality of pump unit cells 402 (see FIG. 4). Each pump unit cell 402 includes a diode and a capacitor $C_i$. In the charge pump 330, the pump unit cells 402 are coupled, in series (thereby creating a horizontal row of pump unit cells in FIG. 3), and the greater the number of pump unit cells in such series arrangement, the greater the voltage $V_{OUT}$ at the output of the charge pump 330. The charge pump 330 also includes more than one series arrangement, i.e., more than one row in FIG. 3, in which each series arrangement is configured in a parallel arrangement with the other series arrangements. The greater the number of series arrangements (coupled in a parallel configuration with each other), the greater the current capacity of the output of the charge pump 330. By having a plurality of series arrangements, the size of each capacitor $C_i$ is reduced, thereby advantageously reducing the area of the charge pump 330. During normal operation, each series arrangement, i.e., each row in FIG. 3, is coupled to a clock signal that is delayed from the clock signals coupled to the other series arrangements. By "during normal operation", it is meant during operation of the charge pump circuit 300 other than during start-up of the charge pump circuit. The clock signals that are named in FIG. 4 are the interleaved clock signals that are outputted to the charge pump 330 during normal operation. See FIG. 5 for the names of alternative signals that are outputted to the charge pump 330 during start-up.

A number N of pump unit cells 402 in a row of the charge pump 330 is determined by a number of diode/pump capacitor pairs in the row. The charge pump 330 has N pump unit cells 402 in each row. N pump unit cells 402 in a row results in an output voltage $V_{OUT}$ that is equal to the input voltage $V_{IN}$ multiplied by N+1. A number of interleaved rows of the charge pump 330 is determined by the number m of clock phases that drive the charge pump during normal operation. The charge pump 330 has m rows and is driven by m clock phases during normal operation. The charge pump 330 has m pump unit cells 402 in each column.

During normal operation, each clock signal of the plurality of signals that are outputted by the m-phase clock generator 310 is coupled in an interleaved fashion to a different row of the charge pump 330. During normal operation, the pump capacitors of the charge pump 330 are charged one row by one row in each clock transition. During normal operation, each pump capacitor in a column of the charge pump 330 is charged at a different time. During normal operation, the capacitors in any given row are charged and discharged one by one in each clock transition which results in $V_{step}$ of a certain size. $V_{step}$ is the amount by which the output voltage $V_{OUT}$ increases at each clock transition. Each clock transition corresponds to one pump capacitor $C_i$ being discharged to the output voltage node. On the other hand, if a clock signal is applied to more than one row and therefore to more than one pump capacitor, at a same time, the amplitude of $V_{step}$ increases. For example, if a clock signal is applied to two (2) rows at a same time, and, therefore, to two (2) pump capacitors at the same time, the amplitude of $V_{step}$ is doubled because two capacitors discharge at the same time. The increase in the amplitude of $V_{step}$ is accomplished by applying all m of the interleaved clock signals outputted by the m-phase clock generator 310 to the bypass circuit 320. All m of the interleaved clock signals have a same frequency, but each has a different phase. The bypass circuit 320 multiplies the frequency of the clock signals from the m-phase clock generator, and produces a multiplied-frequency clock signal that has a frequency that is higher than the frequency of the m interleaved clock signals. The bypass circuit 320 then applies the multiplied-frequency clock signal (CLKOUT) to half of the pump capacitors and a complement of the multiplied-frequency clock signal (CLKOUT_B) to the other half. As a result, $V_{step}$ is larger, thereby reducing a ramp-up time of the charge pump circuit 300. As demonstrated by the equations hereinbelow, it is possible to quantify how much time is saved from the start-up of the charge pump circuit 300 until $V_{OUT}=V_{TARG}$, where $V_{TARG}$ is the target voltage to be achieved by the charge pump circuit.

Regardless of the number of rows, during normal operation of the charge pump circuit 300, each capacitor in each row (as illustrated in FIG. 4) is charged at a different instant of time than the capacitors in corresponding positions in the other rows. During normal operation, a switching frequency $f_{SW}$ of the pump capacitors is the frequency $f_{clk}$ of the m-phase clock generator 310.

Advantageously, during start-up, the charge pump circuit 300 operates differently than its normal operation. When m is an even number, the rising edge of the clock signal is applied at a same time to half of the interleaved rows, and the falling edge of the clock signal is applied at the same time to the other half of the interleaved rows. When the number of rows m is four (4), during start-up of the charge pump circuit 300, each capacitor coupled to a same phase (for example, the top row in FIG. 4) is discharged (or charged, depending on the positive/negative edge of CLK0°/CLK0°_B signals) simultaneously with a capacitor in a corresponding position of another row (for example, the second row from the top in FIG. 4). Each capacitor in the first row is charged/discharged (depending on the edge of their clock signals) simultaneously with each capacitor in the corresponding position in the second row because both rows are controlled by the CLKOUT signal. Furthermore, each capacitor in the third row is charged/discharged (depending on the edge of their clock signals) simultaneously with capacitors in corresponding positions in the fourth row. Each capacitor in the third row is charged/discharged simultaneously with the capacitors in corresponding positions in the fourth row because both rows are controlled by the CLKOUT_B signal. During start-up, twice as many capacitors are charged/discharged during each clock transition compared to normal operation, and, as a result, the magnitude of $V_{step}$ is twice as large compared to $V_{step}$ during normal operation. The time, $\Delta t$, for the output voltage $V_{OUT}$ of the charge pump circuit 300 to reach a target value $V_{TARG}$, is inversely proportional to the number of pump capacitors that are discharged per clock period, which is controlled by the switching frequency. During normal operation, the switching frequency is the frequency of the m-phase clock generator 310. During start-up, the switching frequency is the frequency of the CLKOUT signal and the CLKOUT_B signal, which, of course, have a same frequency.

In one embodiment, when the number of rows is four (m=4), the switching frequency $f_{SW}$ during start-up is two (2) times the frequency of the m-phase clock generator 310, or $2 \times f_{clk}$. Therefore, twice as many pump capacitors are discharged per clock period in comparison to normal operation. Consequently, $\Delta t$ for the charge pump circuit 300 is advantageously reduced to about one-half of $\Delta t$ of known charge pump circuits.

In another embodiment, when the number of rows is six (m=6), the switching frequency $f_{SW}$ during start-up is three (3) times the frequency of the m-phase clock generator 310, or $3 \times f_{clk}$.

In another embodiment, when the number of rows is eight (m=8), the switching frequency $f_{SW}$ during start-up is four (4) times the frequency of the m-phase clock generator 310, or $4 \times f_{clk}$.

When the number of rows is even (m=even), the switching frequency $f_{SW}$ during start-up of the charge pump circuit 300 is, in general, $y \times (m/2) \times f_{clk}$, where y is a real number greater than one, and where y depends on the design of the bypass circuit 320. Therefore, in another embodiment, when the number of rows is four (m=4), the switching frequency during start-up can be $2 \times (m/2) \times f_{clk}$, or four times the frequency of the m-phase clock generator 310. Therefore, in yet another embodiment, when the number of rows is four (m=4), the switching frequency during start-up can be $3 \times (m/2) \times f_{clk}$, or six times the frequency of the m-phase clock generator 310.

As another example, when the number of rows m is three (3), during start-up of the charge pump circuit 300, each capacitor coupled to a same phase (for example, the top row in FIG. 4) is charged/discharged (depending on the edge of their clock signals) at each clock transition of the CLKOUT signal, thereby producing an increase in $V_{OUT}$ in the amount of $V_{step1}$. Each capacitor in corresponding positions in the second and third rows is charged/discharged (depending on the edge of their clock signals) simultaneously but at each clock transition of the CLKOUT_B signal, thereby producing an increase in $V_{OUT}$ in the amount of $V_{step2}$. At each clock transition of the CLKOUT signal, capacitors of a single row are discharged. At each clock transition of the CLKOUT_B signal, capacitors of two rows are discharged. During start-up, when m=3, on average, 1½ times as many capacitors are discharged during each clock transition compared to normal operation. As a result, the magnitude of the mean value of $V_{step}$, which is defined as $V_{step}*$, is 1½ times as large as $V_{step}$ during normal operation, and can be expressed as follows.

$$V_{step}^* = \frac{V_{step1} + V_{step2}}{2} = \frac{2C_i + C_i}{2}\left(\frac{1}{C_i + C_{out}}((N+1)V_{IN} - V_{TARG})\right)$$

$$= \frac{3}{2}\left(\frac{C_i}{C_i + C_{out}}((N+1)V_{IN} - V_{TARG})\right)$$

In one embodiment, when the number of rows is three (m=3), the switching frequency $f_{SW}$ during start-up is three (3) times the frequency of the m-phase clock generator 310, or $3 \times f_{clk}$. The time, $\Delta t$, for the output voltage $V_{OUT}$ of the charge pump circuit 300 to reach a target value $V_{TARG}$, is inversely proportional to the number of pump capacitors that are discharged per clock period, which is controlled by the switching frequency. Therefore, during start-up of the charge pump circuit 300, when the number of rows is three (m=3), three times as many pump capacitors are discharged per clock period in comparison to normal operation. Consequently, $\Delta t$ of the charge pump circuit 300 is advantageously reduced to about one-third of $\Delta t$ of known charge pump circuits.

In another embodiment, when the number of rows is five (m=5), the switching frequency during start-up is five (5) times the frequency $f_{clk}$ of the m-phase clock generator 310, or $5 \times f_{clk}$.

In another embodiment, when the number of rows is seven (m=7), the switching frequency during start-up is seven (7) times the frequency $f_{clk}$ of the m-phase clock generator 310, or $7 \times f_{clk}$.

When the number of rows is odd (m=odd), the switching frequency during start-up of the charge pump circuit 300 is, in general, $z \times m \times f_{clk}$, where z is a real number greater than one, and where z depends on the design of the bypass circuit 320. Therefore, in still another embodiment, when the number of rows is three (m=3), the switching frequency during start-up can be $2 \times 3 \times f_{clk}$, or six (6) times the frequency of the m-phase clock generator 310. Therefore, in yet another embodiment, when the number of rows is three (m=3), the switching frequency during start-up can be $3 \times 3 \times f_{clk}$, or nine (9) times the frequency of the m-phase clock generator 310.

The charge pump circuit 300 activates the bypass circuit 320 during a ramp-up period of the charge pump 330, that is, when $V_{OUT}$ is transitioning from the $V_{IN}$ value to a $V_{TARG}$ value, which occurs when the charge pump circuit is first turned on. Prior to $V_{OUT}$ attaining the $V_{TARG}$ value, the PUMP_OK signal is low, or logical "0". Subsequent to $V_{OUT}$ attaining the $V_{TARG}$ value, the PUMP_OK signal is high, or logical "1". After $V_{OUT}$ attains the $V_{TARG}$ value, the m-phase clock generator 310 is automatically connected to the charge pump 330, thereby disconnecting a clock frequency multiplier 505 (see FIG. 5) in the bypass circuit 320 and resulting in normal operation of the charge pump 330. When $V_{OUT}=V_{TARG}$, the bypass circuit 320 allows the charge pump circuit 300 to work in a normal fashion according to its design specifications. Therefore, after $V_{OUT}=V_{TARG}$, the bypass circuit 320 does not affect operation of the charge pump 330.

With the charge pump circuit 300, the length of the interval from when the charge pump circuit is first turned on to when $V_{OUT}=V_{TARG}$ is shortened by rearranging switching sequences of the pump capacitors. One embodiment comprises increasing the switching frequency $f_{SW}$ of the pump capacitors by using the outputs of the clock frequency multiplier 505 (see FIG. 5) in the bypass circuit 320 to switch the pump capacitors, instead of increasing the clock frequency $f_{clk}$ of the m-phase clock generator 310 and using the outputs of the m-phase clock generator to switch the pump capacitors. The increase in the switching frequency $f_{SW}$ of the pump capacitors occurs only while the output voltage $V_{out}$ of the charge pump circuit is transitioning from $V_{IN}$ to $V_{TARG}$. After $V_{IN}$ reaches $V_{TARG}$, the m-phase clock generator is coupled directly to the charge pump 330, thereby resulting in normal operation of the charge pump circuit 300, wherein the switching frequency $f_{SW}$ of the pump capacitors is the clock frequency $f_{clk}$ of the m-phase clock generator 310.

When the charge pump circuit 300 is ramping up, the output of the comparator 360 is in a state that turns on the charge pump 330 in order to charge the output capacitor $C_{out}$ 340. Before $V_{OUT}$ reaches $V_{TARG}$ for the first time, one of the CLKOUT and CLKOUT_B signals is applied to each pump unit cell 402 of the charge pump 330, thereby causing the capacitors within pump unit cells to charge and discharge in a fast start-up manner. Therefore, changing the way that the clock signals are applied to the pump unit cells 402 shortens the time the charge pump circuit 300 needs to achieve $V_{TARG}$. After $V_{OUT}$ reaches $V_{TARG}$ for the first time, one of the m-phase clocks signals is applied to each pump unit cell 402 of the charge pump 330, thereby causing the capacitors within pump unit cells to charge and discharge in a normal manner.

Figure 5:
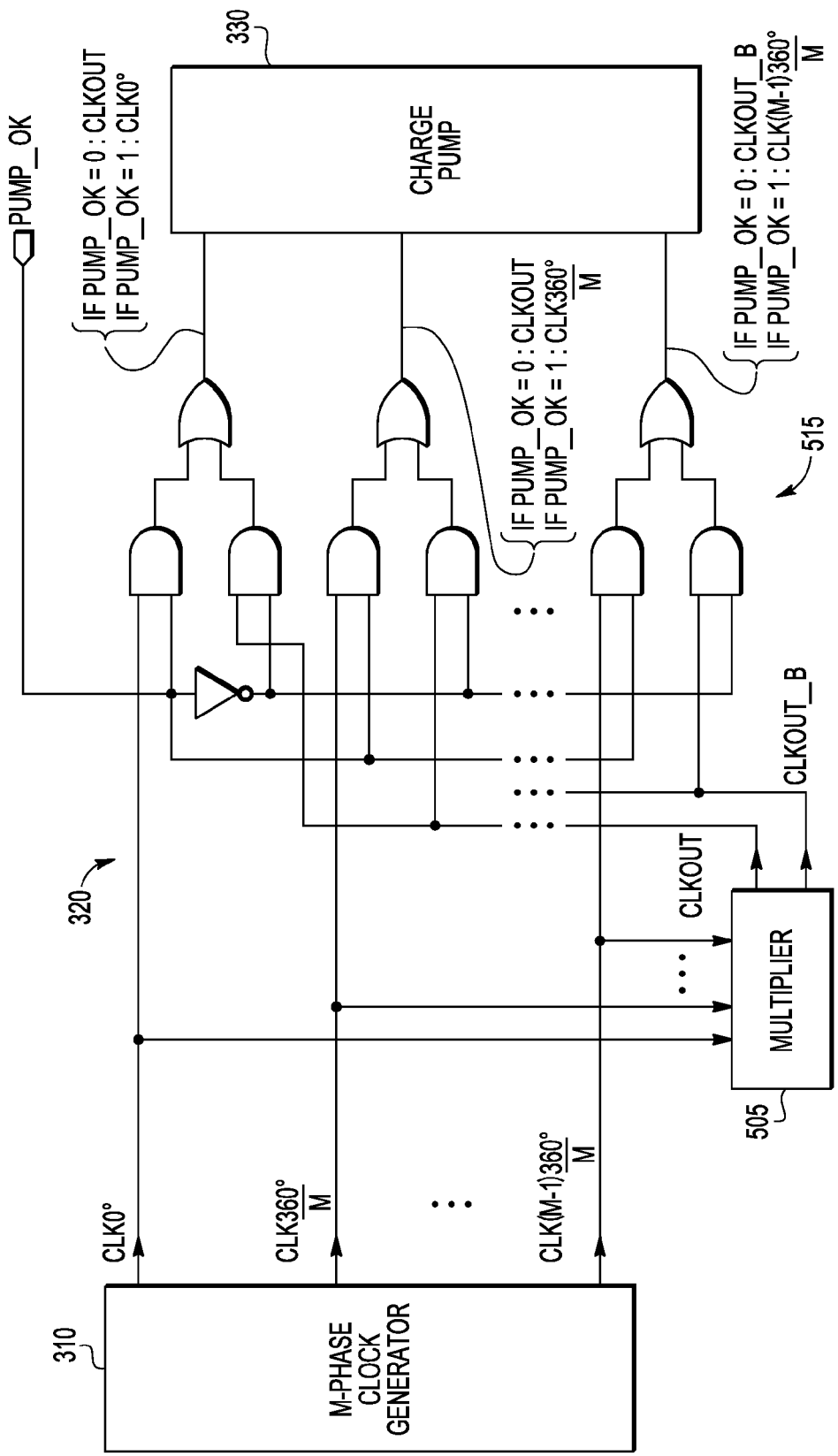
FIG. 5 is simplified schematic of the bypass circuit of FIG. 3, including a clock frequency multiplier.

FIG. 5 is simplified schematic of the bypass circuit 320. The bypass circuit 320 comprises a clock frequency multiplier 505 and switch circuitry 515. In one embodiment, the switch circuitry 515 comprises at least six (6) AND gates, at least three (3) OR gates, and an inverter, as is illustrated in FIG. 5. In some embodiments, the clock frequency multiplier 505 comprises combinational logic that uses the plurality of m-phase clock signals from the m-phase clock generator 310 to generate the CLKOUT signal and the CLKOUT_B signal. In other embodiments, the clock frequency multiplier 505 comprises other types of circuitry to accomplish multiplication. The clock frequency multiplier 505 multiplies the frequency $f_{clk}$ of the clock signal and applies the multiplied clock signal to the charge pump 330 in order to cause at least some of the pump unit cells 402 to operate in parallel. Therefore, the amplitude of $V_{STEP}$ increases by a factor that depends on the number of clock phases. The greater number of clock phases a charge pump 330 has, the faster the charge pump circuit 300 achieves $V_{TARG}$. The charge pump circuit 300 can be used with any interleaved charge pump 330 that uses at least three clock phases, such as CLK0°, CLK120°, and CLK240°.

The switch circuitry 515 selects one of: the set of the clock signals outputted by the m-phase clock generator 310, and the two signals outputted by the clock frequency multiplier 505, depending on a value of the PUMP_OK signal outputted by the regulation stage 335. The switch circuitry 515 comprises a plurality of switches that selects one of: the clock signals, i.e., CLK0°, CLK360°/m, CLK2×360°/m, CLK3×360°/m, . . . , CLK(m−1)×360°/m; and the multiplied clock signals, i.e., CLKOUT and CLKOUT_B. The bypass circuit 320 drives the charge pump 330 with the signals selected by the switch circuitry 515. The clock signals that are listed at the right side of FIG. 5 if PUMP_OK=1 are the interleaved clock signals that are outputted to the charge pump 330 during normal operation. The clock signals that are listed at the right side of FIG. 5 if PUMP_OK=0 are the multiplied clock signals that are outputted to the charge pump 330 during start-up.

For an even number of phases, the CLKOUT terminal and the CLKOUT_B terminal of the clock frequency multiplier 505 are connected to a same number of capacitors. The CLKOUT terminal is connected to half of the capacitors, and CLKOUT_B terminal is connected to the other half. For an odd number of phases, the CLKOUT terminal and the CLKOUT_B terminal are connected to a different number of capacitors, because division by two does not result in an integer. For example, if a charge pump circuit 300 has five clock phases, the CLKOUT terminal is connected to three switches and CLKOUT_B terminal is connected to the other two switches, or vice versa.

Figure 6:
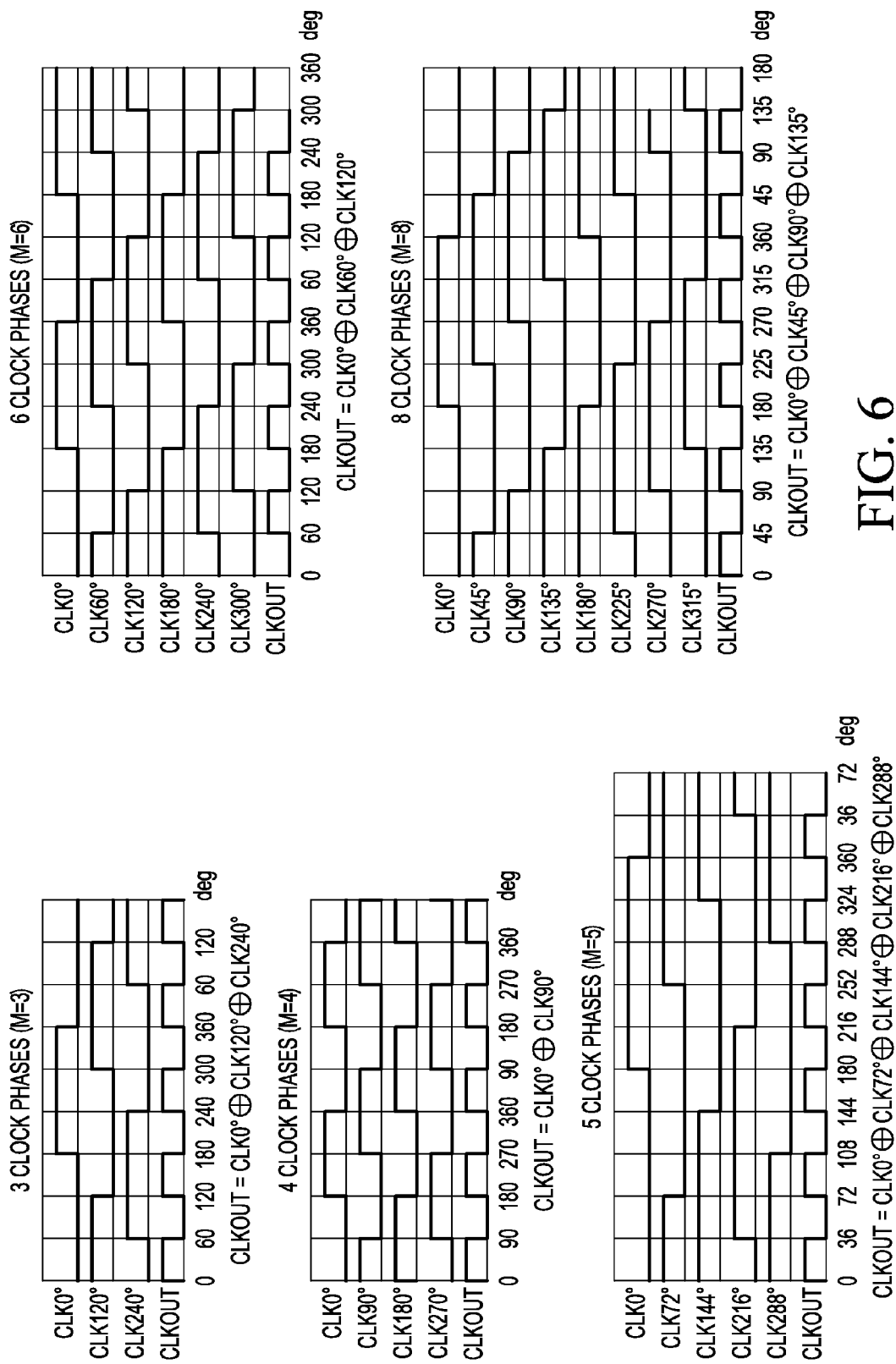
FIG. 6 shows a timing diagram with input signals and an output signal, for each of five embodiments of the clock frequency multiplier of FIG. 5.

FIG. 6 shows five timing diagrams for each of five embodiments of the clock frequency multiplier 505. Each timing diagram illustrates how each embodiment of the clock frequency multiplier 505 accepts a plurality of m-phase clock signals from the m-phase clock generator 310 and therefrom generates a CLKOUT signal, the frequency of which is proportional to the number of phases. Each timing diagram in FIG. 6 is an example of a clock frequency multiplier 505 for three, four, five, six and eight clock phases. Other logic circuits can be used for other number of clock phases.

For example, for three phases (m=3), the combinational logic of the clock frequency multiplier 505 is: CLKOUT=CLK0°⊕CLK120°⊕CLK240°. In such example, when $f_{clk}$=60 MHz, $f_{SW}$=180 MHz, or $mf_{clk}$.

For example, for four phases (m=4), the combinational logic of the clock frequency multiplier 505 is: CLKOUT=CLK0°⊕CLK90°. In such example, when $f_{clk}$=60 MHz, $f_{SW}$=120 MHz, or $(m/2)f_{clk}$.

For example, for five phases (m=5), the combinational logic of the clock frequency multiplier 505 is: CLKOUT=CLK0°⊕CLK72°⊕CLK144°⊕CLK216°⊕CLK288°. In such example, when $f_{clk}$=60 MHz, $f_{SW}$=300 MHz, or $mf_{clk}$.

For example, for six phases (m=6), the combinational logic of the clock frequency multiplier 505 is: CLKOUT=CLK0°⊕CLK60°⊕CLK120°. In such example, when $f_{clk}$=60 MHz, $f_{SW}$=180 MHz, or $(m/2)f_{clk}$.

The increase in $f_{SW}$ compared to $f_{clk}$ is more pronounced when m is odd than when m is even. This attribute causes the charge pump circuit 300 to be most effective, during start-up, when m is odd. Nevertheless, when m is even, the charge pump circuit 300 is more effective, during start-up, than a known charge pump circuit.

Notwithstanding the fact that there is a more significant reduction in Δt when m is an odd number than when m is an even number, in one embodiment of the charge pump circuit 300, m is chosen to be an even number because the circuitry of the clock frequency multiplier 505 can be smaller when m is an even number, as can be seen from the above examples, wherein there are fewer exclusive-or (⊕) operations when m is an even number.

Prior to the output voltage achieving $V_{TARG}$, the bypass circuit 320 blocks the clock signals, outputted by the m-phase clock generator 310, from reaching the charge pump 330, and the bypass circuit drives the multiplied clock signals, outputted by the clock frequency multiplier 505, to the charge pump 330. This happens while the PUMP_OK signal is disabled, or at logical "0", which indicates that $V_{OUT}$ is not yet stabilized.

When the PUMP_OK is enabled, that is, when $V_{OUT}=V_{TARG}$, the bypass circuit 320 disconnects the clock frequency multiplier 505 from the charge pump 330, and allows the clock signals outputted by the m-phase clock generator 310 to drive the charge pump 330.

The following equations quantify how much time is saved (compared to start-up of a known charge pump circuit) from start-up of the charge pump circuit 300 until the $V_{OUT}=V_{TARG}$.

During normal operation, for each pump unit cell 402, i.e., for one capacitor $C_i$, each discharge, or pumping, results in an increase of $V_{OUT}$ by an amount of one step voltage $V_{step}$, which has the following value per clock cycle:

$$V_{step} = \frac{C_i}{C_i + C_{out}}((N+1)V_{IN} - V_{TARG})$$

However, during start-up, and when m is an even number, there are two pump unit cells 402 discharging, or pumping, at the same time, which results in double the step voltage, given by:

$$V_{step}^* = \frac{2C_i}{C_i + C_{out}}((N+1)V_{IN} - V_{TARG}) \qquad \text{Equation (1)}$$

Therefore, $V_{step}^*/V_{step}=2$.
For $$\frac{m}{2}$$

pump capacitors $C_i$, the Equation (1) becomes:

$$V_{step}^* = \frac{C_i \frac{m}{2}}{C_i \frac{m}{2} + C_{out}}((N+1)V_{IN} - V_{TARG})$$

Clearly, $V_{step}^*$ is advantageously greater than $V_{step}$.

$$V_{step}^* = \frac{C_i \frac{m}{2}}{C_i \frac{m + 2C_{out}}{2}}((N+1)V_{IN} - V_{TARG})$$

$$V_{step}^* = \frac{mC_i}{mC_i + 2C_{out}}((N+1)V_{IN} - V_{TARG})$$

$C_{out}$ is much larger than $C_i$. Therefore, assuming $C_i \ll 2C_{out}$ and if $mC_i \ll 2C_{out}$, then $$V_{step}^* \approx \frac{mC_i}{2C_{out}}((N+1)V_{IN} - V_{TARG})$$

and $$V_{step} \approx \frac{C_i}{C_{out}}((N+1)V_{IN} - V_{TARG})$$

$$\frac{V_{step}^*}{V_{step}} \cong \frac{m}{2},$$

where m=number of clock phases, and N=number of pump unit cells.

The result is that the charge pump 330 advantageously needs to perform fewer pumps in order to make the output voltage $V_{OUT}$ reach the target value $V_{TARG}$. Therefore:

$V_{TARG}-V_{IN}=XV_{step}$, where X=number of steps prior to $V_{OUT}$ reaching $V_{TARG}$, during start-up of a known charge pump circuit.

$$\text{Therefore, } X = \frac{V_{TARG} - V_{IN}}{V_{step}} \qquad \text{Equation (2)}$$

$$X^* = \frac{V_{TARG} - V_{IN}}{V_{step}^*} \qquad \text{Equation (3)}$$

where X*=number of steps, prior to $V_{OUT}$ reaching $V_{TARG}$, during start-up of the charge pump circuit 300.

Therefore, for an even number of phases, combining Equation (2) and Equation (3), yields $$\frac{X^*}{X} = \frac{V_{step}}{V_{step}^*} = \frac{2}{m} \quad \text{Equation (4)}$$

The time required for a known charge pump circuit to reach $V_{TARG}$ can be expressed as:

$$\Delta t = X \frac{T_{clk}}{m},$$

where $T_{clk} = 1/f_{clk}$

For an even number of phases, during start-up, the time required for the charge pump circuit 300 to reach $V_{TARG}$ can be expressed as:

$$\Delta t^* = X^* \frac{T_{clk}}{m}$$

Therefore, for an even number of phases, $$\frac{\Delta t^*}{\Delta t} = \frac{X^*}{X} = \frac{2}{m} \quad \text{Equation (5)}$$

Thus, the time saved by the charge pump circuit 300 is directly proportional to the number of phases used in the charge pump circuit.

The equations shown above assume that the number of paralleled pump unit cells 402 is equally divided for each clock pulse. This assumption results in an even number of clock phases. But this concept can also be applied to an odd number of phases, as follows:

For each pump unit cell 402, i.e., for one capacitor $C_i$, $V_{step}$ has the following value per clock cycle:

$$V_{step} \approx \frac{C_i}{C_{out}}((N+1)V_{IN} - V_{TARG}) \quad \text{Equation (6)}$$

For $$\frac{m+1}{2}$$

pump capacitors $C_i$, Equation (6) becomes:

$$V_{step_1} \approx \frac{C_i(m+1)}{2C_{out}}((N+1)V_{IN} - V_{TARG})$$

For $$\frac{m-1}{2}$$

pump capacitors $C_i$, Equation (6) becomes:

$$V_{step_2} \approx V_{IN} \frac{C_i(m-1)}{2C_{out}}((N+1)V_{IN} - V_{TARG})$$

Therefore, the mean value for $V_{step}$ is as follows:

$$V_{step}^* = \frac{V_{step_1} + V_{step_2}}{2} = \frac{mC_i}{2C_{out}}((N+1)V_{IN} - V_{TARG})$$

Therefore, $\frac{V_{step}^*}{V_{step}} = \frac{m}{2}$ $V_{TARG} - V_{IN} = XV_{step}$, where $X$ = number of steps prior to $V_{OUT}$ reaching $V_{TARG}$, during start-up of a known charge pump circuit.

$$\text{Therefore, } X = \frac{V_{TARG} - V_{IN}}{V_{step}} \quad \text{Equation (7)}$$

$$\text{and } X^* = \frac{V_{TARG} - V_{IN}}{V_{step}^*} \quad \text{Equation (8)}$$

where $X^*$ = number of steps prior to $V_{OUT}$ reaching $V_{TARG}$, during start-up of the charge pump circuit 300.

Therefore, combining Equation (7) and Equation (8), for an odd number of phases, yields $$\frac{X^*}{X} = \frac{V_{step}}{V_{step}^*} = \frac{2}{m} \quad \text{Equation (9)}$$

For an even number of phases, equally delayed in time, and assuming a duty cycle of the applied clock signals is 0.5, it can be verified that two of these clock signals change their levels at the same time, with one of them going from a low logic level to high logic level, and the other one going from high to low. Clock signals that change their levels at the same time have a same behavior as if only one clock signal were applied, as is the case with the charge pump circuit 300. When two clock signals change their levels in the same time, such as in the charge pump circuit 300 during start-up, there are two paralleled pump unit cells 402 pumping their loads, each normally, but, advantageously, at a same time. Therefore, Equations (4) and (9) have the number "2" in their numerator.

For an odd number of phases, the following can be shown:

The time required for a known charge pump circuit to reach $V_{TARG}$ can be expressed as:

$$\Delta t = X \frac{T_{clk}}{m}$$

and

For an odd number of phases, during start-up, the time required for the charge pump circuit 300 to reach $V_{TARG}$ can be expressed as:

$$\Delta t^* = X^* \frac{T_{clk}}{2m}$$

Therefore, for an odd number of phases, $$\frac{\Delta t^*}{\Delta t} = \frac{X^*}{X} = \frac{1}{m}$$ Equation (10)

An odd number of phases results in a greater reduction in ramp-up time than an even number of phases because of the frequency of the CLKOUT signal relative to the frequency of the clock signal outputted by the m-phase clock generator 310. If m is even, the frequency of the CLKOUT signal is m/2 times the frequency of the clock signal outputted by the m-phase clock generator 310. But, if m is odd, the frequency of the CLKOUT signal is m times the frequency of the clock signal outputted by the m-phase clock generator 310.

A comparison of Equation (5) and Equation (10) indicates that there is a more significant time reduction for an odd number of phases than for an even number of phases. For example, for three phases, the charge pump circuit 300 reduces the ramp-up time to one-third (⅓) of the ramp-up time of a known charge pump circuit. For four phases, the charge pump circuit 300 reduces the ramp-up time to one-half (½) of the ramp-up time of a known charge pump circuit. For five phases, the charge pump circuit 300 reduces the ramp-up time to one-fifth (⅕) of the ramp-up time of a known charge pump circuit. For six, seven and eight phases, the charge pump circuit 300 reduces the ramp-up time to ⅓, ⅐ and ¼, respectively, of the ramp-up time of a known charge pump circuit.

Figure 7:
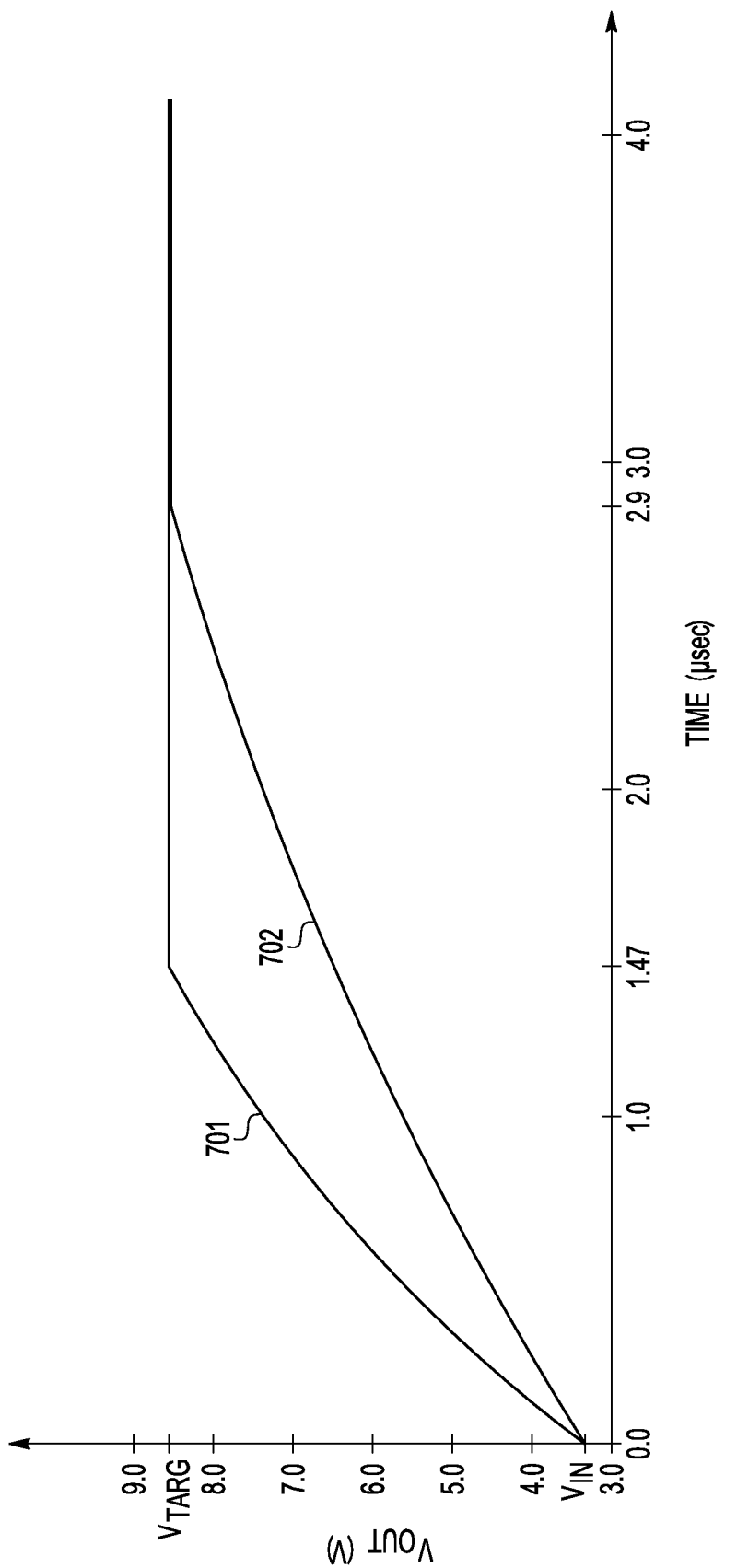
FIG. 7 is a chart of a simulation of operation of the charge pump circuit of FIG. 3 compared with a chart of a simulation of operation of a known charge pump circuit.

FIG. 7 is a chart 700 of a simulation of operation of the charge pump circuit 300 compared with a chart of a simulation of operation of a known charge pump circuit that lacks the bypass circuit 320 of the charge pump circuit 300. In the simulation, $C_i$=1 pF, $C_{out}$=300 pF, $f_{clk}$=60 MHz, $V_{IN}$=3.3V, $V_{TARG}$=8.5V, N=3 (therefore, $V_{MAX}$=13.2V) and m=4 (therefore, $f_{SW}$=120 MHz). FIG. 7 shows that $V_{OUT}$ 701 starts at 3.3V that $V_{OUT}$ for the charge pump circuit 300 reaches $V_{TARG}$ after about 1.47 μs. Therefore, for the charge pump circuit 300, Δt=1.47 μs. FIG. 7 also shows that $V_{OUT}$ 702 for the known charge pump circuit reaches $V_{TARG}$ after about 2.90 μs. Therefore, for the known charge pump circuit, Δt=2.90 μs. The charge pump circuit 300 has a smaller Δt compared to the known charge pump circuit. Advantageously, the ramp-up time of the charge pump circuit 300 is 1.43 μs shorter than the ramp-up time of the known charge pump circuit, or advantageously only about half of the ramp-up time of the known charge pump circuit.

In one embodiment, clocking circuitry includes the m-phase clock generator 310 and the bypass circuit 320, and the bypass circuit includes a multiplier 505 that multiplies the frequency of the signals generated by the m-phase clock generator.

In another embodiment (not shown), clocking circuitry includes the m-phase clock generator 310 and the bypass circuit 320, and the bypass circuit includes a divider (not shown) that divides the frequency of the signals generated by the m-phase clock generator. In such other embodiment, the m-phase clock generator 310 generates higher frequency alternative clock signals that are used during start-up of the charge pump circuit 300, and the divider divides the frequency of the signals generated by the m-phase clock generator to produce lower frequency clock signals that are used during normal operation of the charge pump circuit 300.

In yet another embodiment (not shown), the clocking circuitry includes two separate and independent clock generating circuits: a first clock generating circuit that generates the plurality of m-phase clock signals at a first frequency, which are used during normal operation of the charge pump circuit 300, and a second clock generating circuit that generates the alternative clock signals at a second frequency that is higher than the first frequency, which are used during start-up of the charge pump circuit 300. In this yet another embodiment, the clocking circuitry includes switch circuitry that selects one of: the plurality of m-phase clock signals generated by first clock generating circuit, and the alternative clock signals generated by the second clock generating circuit, depending on a value of the PUMP_OK signal outputted by the regulation stage 335.

In still another embodiment (not shown), the clocking circuitry includes a phase multiplex divider.

In one embodiment, the charge pump circuit 300 includes the charge pump 330 for outputting the output voltage; clocking circuitry, coupled to the charge pump, for generating the clock signals (CLK0°, CLK360°/m, CLK2×360°/m, CLK3×360°/m, . . . , CLK(m−1)×360°/m) for driving circuitry of the charge pump, and for generating at least one alternative clock signal (CLKOUT and CLKOUT_B) for driving the circuitry of the charge pump; and the regulation stage 335, coupled to an output terminal of the charge pump, for producing a signal (PUMP_OK) indicative of a present value of the output voltage, wherein, depending on a state of the signal indicative of a present value of the output voltage, the clocking circuitry couples to the charge pump one of the group consisting of: the clock signals and the at least one alternative clock signal.

In one embodiment, the charge pump circuit 300 includes the charge pump 330, which has a supply voltage input terminal for coupling to a supply voltage $V_{IN}$. In this one embodiment, the charge pump 330 includes a plurality of m rows, each of the m rows includes a plurality of N pump unit cells, arranged in a series configuration, forming each row, for producing an output voltage $V_{OUT}$=(N−1)$V_{IN}$, and the plurality of m rows are arranged in a parallel configuration with each other. This one embodiment also includes clocking circuitry, coupled to the charge pump 330, for generating m clock signals (CLK0°, CLK360°/m, CLK2×360°/m, CLK3×360°/m, . . . , CLK(m−1)×360°/m) for switching the pump unit cells, and for generating at least one alternative clock signal (CLKOUT and CLKOUT_B) for switching the pump unit cells, wherein, prior to completion of start-up of the charge pump circuit 300, the clocking circuitry couples to the charge pump the at least one alternative clock signal, and wherein, subsequent to completion of start-up of the charge pump circuit, the clocking circuitry couples to the charge pump the clock signals.

The switching frequency $f_{SW}$ for switching each pump unit cell during start-up is m/2 times the frequency of the clock signals (CLK0°, CLK360°/m, CLK2×360°/m, CLK3×360°/m, . . . , CLK(m−1)×360°/m), if m is an even number, and is m times the frequency of the clock signals, if m is an odd number.

Prior to completion of start-up of the charge pump circuit 300, all the rows of pump unit cells are driven by one of two alternate clock signals: a first alternate clock signal (CLKOUT) and a second alternate clock signal (CLKOUT_B), and a phase difference between the first alternate clock signal and the second alternate clock signal is 180°.

Subsequent to completion of start-up of the charge pump circuit 300, each row of pump unit cells is driven by a clock signal that has a different phase from a clock signal driving another row, and a phase difference between each clock signal is at least 360°/m, where m is a number of rows.

Prior to completion of start-up of the charge pump circuit 300, at least two rows of pump unit cells are driven by a same alternative clock signal, thereby causing a pump unit cell in a row to charge/discharge at a same time as another pump unit cell in another row, to decrease a start-up time of the charge pump circuit.

Subsequent to completion of start-up of the charge pump circuit 300, each row of pump unit cells is driven by a clock signal that has a different phase from the clock signal driving other rows, thereby causing a pump unit cell in each row to charge/discharge at a different time as another pump unit cell in another row, to reduce ripple at the output of the charge pump circuit.

In one embodiment, the charge pump circuit 300 is part of a System-on-Chip (SoC) that includes flash memory, and in such embodiment, the power supply voltage is 3.3V. In such embodiment, the flash memory uses 4.2V to read, but requires 8.5V to program, and both −8.5 and +8.5V to erase. The charge pump circuit 300 reduces the start-up voltage stabilization time of the flash memory, therefore, reducing the total time required by the flash memory to perform a PROGRAM or an ERASE operation. The output of the charge pump circuit 300 may be used to program, erase and read bitcells within a memory array of a flash memory system. A large stabilization delay time, which is equal to Δt, can limit use of flash memory. For flash memory that needs to program bitcells quickly, a charge pump circuit should be designed to allow a PROGRAM operation to happen in a short amount of time. Flash memory architectures take into account the stabilization period of a charge pump circuit in determining a total operation time. For example, for a PROGRAM operation, this stabilization period may be about 50% of the total operating time. Logic circuitry of flash memories takes into account a specific voltage feedback flag, such as the PUMP_OK signal, that indicates that $V_{OUT}$ is stabilized. Only after $V_{OUT}$ is stabilized, is a PROGRAM or an ERASE operation performed.

In one embodiment, the SoC includes an integrated circuit substrate; a flash memory circuit disposed on the integrated circuit substrate; and the charge pump circuit 300, disposed on the integrated circuit substrate, for providing power to the flash memory circuit at an output voltage. In this one embodiment, the charge pump circuit 300 includes the charge pump 330, which has an output terminal for providing the output voltage; and clocking circuitry, coupled to the charge pump, for generating clock signals (CLK0°, CLK360°/m, CLK2×360°/m, CLK3×360°/m, . . . , CLK(m−1)×360°/m)) for the charge pump, the clock signals having a frequency, and for generating at least one alternative clock signal (CLKOUT and CLKOUT_B) for driving the charge pump, the at least one alternative clock signal having a higher frequency, wherein, prior to completion of start-up of the charge pump circuit, the clocking circuitry provides the at least one alternative clock signal for driving the charge pump, and wherein, subsequent to completion of start-up of the charge pump circuit, the clocking circuitry provides the clock signals for driving the charge pump.

Typically, about 100-500 transitions of the CLKOUT signal occur before $V_{OUT}$ reaches $V_{TARG}$. The number of transitions of the CLKOUT signal needed for $V_{OUT}$ to reach $V_{TARG}$ depends on the total capacitance of all the pump capacitors $C_i$ relative to the capacitance of the output capacitor $C_{out}$, on the equivalent series resistance (ESR) of the diodes, and on other factors.

An advantage of the charge pump circuit 300 is that the frequency of the signals generated by the m-phase clock generator 310 does not need to be increased, and no components outside of the charge pump circuit need to be redesigned. Any increase in area of the charge pump circuit 300 over a known charge pump circuit that may occur is negligible. Advantageously, the charge pump circuit 300 does not need, and, therefore, does not include, any extra pump capacitors $C_i$, compared to a known charge pump circuit.

The method in accordance with the invention can be used in most charge pump circuits, covering all operation modes, because most charge pump circuits ramp up their output voltage, and most charge pump circuits have either a comparator or an operational amplifier in their regulation stage.

Although, in one exemplary embodiment, the charge pump circuit 300 is disposed on an integrated circuit fabricated using CMOS technology, the charge pump circuit can also be disposed on an integrated circuit fabricated using other technologies.

Although the invention is described herein with reference to specific embodiments, various modifications and changes can be made without departing from the scope of the present invention as set forth in the claims below. For instance, although the description of one exemplary embodiment of the charge pump circuit 300 states that the charge pump circuit is disposed on an integrated circuit, the invention is equally usable when constructed entirely of components consisting of discrete devices.

Although the invention has been described with respect to specific conductivity types or polarity of potentials, skilled artisans appreciated that conductivity types and polarities of potentials may be reversed.

The specification and figures are to be regarded in an illustrative rather than a restrictive sense, and all such modifications are intended to be included within the scope of the present invention. Any benefits, advantages or solutions to problems described herein with regard to specific embodiments are not intended to be construed as a critical, required or essential feature or element of any or all the claims. Unless stated otherwise, terms such as "first" and "second" are used to arbitrarily distinguish between the elements such terms describe. Thus, these terms are not necessarily intended to indicate temporal or other prioritization of such elements. Note that the term "couple" has been used to denote that one or more additional elements may be interposed between two elements that are coupled.

Although the invention is described herein with reference to specific embodiments, various modifications and changes can be made without departing from the scope of the present invention as set forth in the claims below.

What is claimed is:

1. A charge pump circuit, comprising:
   a charge pump, for outputting an output voltage;
   clocking circuitry, coupled to the charge pump, for generating clock signals for driving circuitry of the charge pump, and for generating at least one alternative clock signal for driving the circuitry of the charge pump; and
   a regulation stage, coupled to an output terminal of the charge pump, for producing a signal indicative of a present value of the output voltage,
   wherein, during start-up of the charge pump circuit, depending on a state of the signal indicative of a present value of the output voltage, the clocking circuitry couples to the charge pump one of the group consisting of:
      the clock signals and not the at least one alternative clock signal, and
      the at least one alternative clock signal and not the clock signals,
   wherein the clock signals have a frequency and the at least one alternative clock signal has a higher frequency.

2. The charge pump circuit of claim 1, wherein the clocking circuitry includes a clock frequency multiplier circuit that produces the at least one alternative clock signal, the clock frequency multiplier circuit having input terminals for receiving the clock signals and at least one output terminal for outputting the at least one alternative clock signal, wherein the clock frequency multiplier circuit includes combinational logic that uses the clock signals to produce the at least one alternative clock signal.

3. The charge pump circuit of claim 1, wherein the at least one alternative clock signal comprises a first alternative clock signal and a second alternative clock signal that has a phase that is an inverse of a phase of the first alternative clock signal.

4. The charge pump circuit of claim 1, wherein the charge pump has a supply voltage input terminal for receiving a supply voltage $V_{IN}$, and wherein the charge pump includes a plurality of N pump unit cells, arranged in a series configuration, forming a row, for producing an output voltage $V_{OUT}=(N-1)V_{IN}$, and a plurality of m rows, arranged in a parallel configuration with each other, for controlling a current capacity of the charge pump.

5. The charge pump circuit of claim 4, wherein, during start-up of the charge pump circuit, at least two rows of pump unit cells are driven by a same alternative clock signal, thereby causing a pump unit cell in a row to charge/discharge at a same time as another pump unit cell in another row, and wherein after start-up, one row is driven by a first clock signal and another row is driven by a second clock signal that has a phase difference with the first clock signal.

6. The charge pump circuit of claim 1, wherein the clocking circuitry includes switch circuitry having input terminals for receiving the clock signals and at least one input terminal for receiving the at least one alternative clock signal and a plurality of output terminals each output terminal for outputting one of the clock signals or the at least one alternative clock signal.

7. The charge pump circuit of claim 6, wherein the switch circuitry outputs one:
   of the clock signals, and
   the at least one alternative clock signal,
   depending on the state of the signal indicative of a present value of the output voltage.

8. The charge pump circuit of claim 7, wherein the switch circuitry outputs the at least one alternative clock signal prior to completion of start-up of the charge pump circuit.

9. The charge pump circuit of claim 7, wherein the switch circuitry outputs the clock signals subsequent to completion of start-up of the charge pump circuit.

10. A System-on-Chip (SoC), comprising:
    an integrated circuit substrate;
    a flash memory circuit disposed on the integrated circuit substrate; and
    a charge pump circuit, disposed on the integrated circuit substrate, for providing power to the flash memory circuit at an output voltage, the charge pump circuit including:
       a charge pump having an output terminal for providing the output voltage, and
       clocking circuitry coupled to the charge pump, for generating clock signals for the charge pump, the clock signals having a frequency, and for generating at least one alternative clock signal for driving the charge pump, the at least one alternative clock signal having a higher frequency,
       wherein, prior to completion of start-up of the charge pump circuit, the clocking circuitry provides the at least one alternative clock signal for driving the charge pump, and
       wherein, subsequent to completion of start-up of the charge pump circuit, the clocking circuitry provides the clock signals for driving the charge pump.

11. The SoC of claim 10, wherein, prior to completion of start-up of the charge pump circuit, the clocking circuitry does not provide the clock signals to the charge pump.

12. The SoC of claim 10, wherein, subsequent to completion of the start-up of the charge pump circuit, the clocking circuitry does not provide the at least one alternative clock signal to the charge pump.

13. A charge pump circuit, comprising:
    a charge pump having a supply voltage input terminal for coupling to a supply voltage $V_{IN}$, the charge pump including a plurality of m rows, each of the m rows including a plurality of N pump unit cells, arranged in a series configuration, forming each row, for producing an output voltage $V_{OUT}=(N-1)V_{IN}$, the plurality of m rows are arranged in a parallel configuration with each other; and
    clocking circuitry coupled to the charge pump, for generating m clock signals for switching the pump unit cells, and for generating at least one alternative clock signal for switching the pump unit cells,
    wherein, prior to completion of start-up of the charge pump circuit, the clocking circuitry couples to the charge pump the at least one alternative clock signal, and
    wherein, subsequent to completion of start-up of the charge pump circuit, the clocking circuitry couples to the charge pump the clock signals.

14. The charge pump circuit of claim 13, wherein the clock signals have a frequency and wherein the at least one alternative clock signal have a higher frequency.

15. The charge pump circuit of claim 14, in which a switching frequency for switching each pump unit cell during start-up is m/2 times the frequency of the clock signals, if m is an even number, and is m times the frequency of the clock signals, if m is an odd number.

16. The charge pump circuit of claim 13, wherein, prior to completion of start-up of the charge pump circuit, all rows of pump unit cells are driven by one of two alternate clock signals: a first alternate clock signal and a second alternate clock signal, wherein a phase difference between the first alternate clock signal and the second alternate clock signal is 180°.

17. The charge pump circuit of claim 13, wherein, subsequent to completion of start-up of the charge pump circuit, each row of pump unit cells is driven by a clock signal that has a different phase from a clock signal driving another row, wherein a phase difference between each clock signal is at least 360°/m, where m is a number of rows.

18. The charge pump circuit of claim 13, wherein, prior to completion of start-up of the charge pump circuit, at least two rows of pump unit cells are driven by a same alternative clock signal, thereby causing a pump unit cell in a row to charge/discharge at a same time as another pump unit cell in another row.

19. The charge pump circuit of claim 18, wherein, subsequent to completion of start-up of the charge pump circuit, each row of pump unit cells is driven by a clock signal that has a different phase from the clock signal driving other rows, thereby causing a pump unit cell in each row to charge/discharge at a different time as another pump unit cell in another row.

* * * * *